Patented Oct. 15, 1935

2,017,808

UNITED STATES PATENT OFFICE 2,017,808

VULCANIZATION OF RUBBER

Herman R. Thies, Akron, Ohio, assignor to Wingfoot Corporation, Wilmington, Del., a corporation of Delaware No Drawing. Application January 16, 1932, Serial No. 587,151

5 Claims. (Cl. 18—53)

My invention relates to improvements in the vulcanization of rubber. More particularly, it relates to the vulcanization of rubber under conditions such that scorching is reduced or eliminated and desirable properties imparted to the product. It extends both to a new method of vulcanizing and to a new rubber composition.

In the compounding of rubber, it is common practice to break down the rubber and work the desired compounding ingredients into the same on a rubber mill, a treatment which results in the evolution of a considerable amount of heat. With the recent introduction of internal mixing machines, still higher temperatures accompany the compounding operations. In the further processing, particularly the calendering and extruding operations, rather high temperatures are necessary.

In the case of rubber mixes containing the more active organic accelerators, particularly ultra-accelerators, it frequently happens that trouble is caused and loss occasioned by "scorching"; i. e. premature vulcanization resulting from the high temperatures encountered during and after compounding. In some cases, precautions are taken to reduce the danger of scorching by cooling the rubber during the compounding step or immediately thereafter.

My invention provides an improved process of vulcanizing in which the danger of scorching even with ultra-accelerators, is either minimized or eliminated entirely.

Briefly stated, I have discovered that by the addition of a small percentage of furoic acid to a rubber compound containing a semi-ultra or ultra-accelerator, the tendency to scorch below temperatures of about 260 degrees F. is greatly reduced or eliminated without, however, appreciably prolonging the time required for satisfactory vulcanization at higher temperatures.

The amount of furoic acid which gives rise to the desired elimination or reduction of scorching is small. In some cases, an amount as small as $\frac{1}{10}$ of one percent, based on the rubber, is sufficient; in others, amounts varying up to about three percent, based on the rubber, give excellent results. The amount will be found to vary, to some extent with the nature of the mix, and particularly with the nature of the accelerator or accelerators employed.

The more active organic accelerators which tend to cause scorching include both the ultra accelerators and certain active accelerators not commonly referred to in the industry as ultra-accelerators. Mercaptobenzothiazole, zinc dimethyl dithio carbamate, the reaction product of mercaptobenzothiazole and diphenyl-guanidine, the butyraldehyde aniline condensation produce prepared according to the process outlined in United States Patent No. 1,780,334 are illustrative of these more active accelerators. These and other accelerators may be used alone or in various admixtures.

In the practice of the invention, the ingredients of the rubber mix may be compounded in the customary manner, either externally on rubber rolls or internally in the Banbury mixer with the incorporation, in either case, of the furoic acid in the mix so that it is present during the mixing operation. The rubber mix containing the furoic acid is stable to a high degree: even though heated to some extent in the mixing apparatus, it nevertheless does not tend to scorch. It can be stored after mixing without the necessity of cooling and without danger of scorching.

My invention will be illustrated by the following examples, indicative of the nature and advantages of the invention. In the tables, the figures under the column "Index number" are the times in minutes (determined by a solubility test) during which the rubber compounds were heated to give a definite degree of scorch, as hereinafter explained. This test is a simple way of determining the scorch-retarding powers of furoic acid.

The index number may be determined by forming pellets from compounded unvulcanized stock, the pellets being about ½ inch in diameter and of uniform thickness. They are then exposed for various lengths of time to a constant temperature (in my tests 99.5 degrees C., a figure representing the average mixing temperature), after which they are removed from the heat and introduced into some inert rubber solvent (for example, a high test gasoline) and allowed to remain for 15 minutes. Thereafter, they are violently agitated for a period of one minute.

If the stock is unscorched, a turbid suspension of rubber compound in gasoline is obtained; if scorched, this turbidity rapidly decreases. The decrease in turbidity is an indication of the degree of scorch and may be measured by ascertaining the height of an obscuring column in an obscurometer, an instrument wherein the observer determines the height of liquid column necessary to obscure a light filament of constant intensity.

One of the most common tests used by rubber technologists for many years for determining scorch is the so-called "hand-feel" test, in which, by pulling samples of the stock in question and observing its snap or elasticity, its degree of scorch is estimated. It has been found by a comparison of these gasoline solubility tests and hand-feel tests that when the height of obscuring column measures 100 mm., the scorching as measured by the "hand-feel" tests is barely perceptible. My index number is the time in minutes of heating at 99.5 degrees C. at which the stock, when subjected to the gasoline solubility tests, gave a height of obscuring column of 100 mm.

It will also be seen from the tensile and elongation figures that the use of furoic acid does not interfere with the curing properties of the stock. In certain cases, the values are even increased. It is of course necessary for best results, as has been pointed out above, to use varying small amounts of acid for different rubber mixes, particularly for different accelerators. The optimum amount is best arrived at by experimentation.

The following examples give the results obtained with the use of mercaptobenzothiazole, an accelerator which is not commonly considered to be an ultra-accelerator, but which, unless special precautions are taken, has a tendency to cause scorching. Although nearly any of the standard rubber formulae may be employed, the following, selected for the sake of simplicity, has been found to be suitable.

|  | Parts by weight |
|---|---|
| Rubber (smoked sheet) | 50.00 |
| Rubber (pale crepe) | 50.00 |
| Zinc oxide | 10.00 |
| Pigment | 10.00 |
| Sulfur | 3.00 |
| Mercaptobenzothiazole | 1.00 |

In this compound, the pigment actually employed was "Rubber Yellow #4", a yellow pigment produced by the Federal Color Laboratory. Its use was simply to facilitate the determination of the index number.

To portions of this compound were then added the furoic acid in varying amounts, after which index numbers were determined as above outlined and the customary rubber tensile and elongation tests obtained. In all cases, a control or blank containing no furoic acid was tested along with the examples containing one part by weight of the acid.

coloring the rubber flooring material as desired. The following data were obtained:

| Material | Amount added | Minutes heated before scorched | | |
|---|---|---|---|---|
| | | 99.5° C. | 113.5° C. | 130° C. |
| Control | | 31 | 10 | 6 |
| Furoic acid | 3 parts | 93 | 31 | 13 |

In certain instances in the compounding of rubber, as for tile, sole, toplift and bead stocks, etc., it is desirable not only that the stock shall have no tendency to scorch, but that the product have a considerable degree of stiffness and hardness. For example, in compounding rubber flooring, one practice is to insist upon a rubber compound having a hardness of 90 or above as determined by a Shore durometer (an instrument registering hardness by resistance to penetration) and to further insist that such a stock possess relatively stiff resistance to bending.

Certain of the more heavily loaded stocks are known not to respond in respect of hardness to the ordinary compounding procedures. In a white tile stock using 1.5 parts by weight mercaptobenzo thiazyl disulfide and .15 part of tetramethyl thiuram disulfide as an accelerating mixture, together with 4 parts sulfur and 125 volumes of loading material, a durometer hardness of only 88 is obtained when cured at the optimum cure of 20 minutes at 285 degrees F. Varying the amounts of accelerators and vulcanizing agents to a reasonable extent does not materially alter this value. The same effect is observable with respect to the resistance to bending, reasonable increases of the curing ingredients offering no stiffer stocks than does the stock above cited.

| Material | Ultimate tensile | | Maximum elongation | | Index-number at 99.5° C. | |
|---|---|---|---|---|---|---|
| | Specimen | Control | Specimen | Control | Specimen | Control |
| Furoic acid | 164 | 166 | 750 | 765 | 120 | 36 |

It is therefore readily seen by comparison of the respective index numbers for the compound and its control that the tendency of the stocks to scorch is greatly retarded by the presence of the above acid. Likewise, it is noted that the tensiles and elongations are substantially equal to those of the control.

Another compound in which furoic acid has been tested is that outlined in the following formula, which exemplifies a type of heavily loaded compound advantageously used in rubber flooring stocks:

| Rubber | 100.00 parts by weight. |
|---|---|
| Loading | 124.00 volumes. |
| Zinc oxide | 5.60 parts by weight. |
| Sulfur | 4.00 parts by weight. |
| Benzothiazyl disulfide | 1.50 parts by weight. |
| Tetra methyl thiuram disulfide | 0.15 parts by weight. |
| Softener | 5.00 parts by weight. |
| Antioxidant | 2.00 parts by weight. |

The 124 volumes of loading material included an inert filler, such as asbestine, and matter for I have found, however, that by adding 3 parts of a furoic acid, the desired properties can be imparted to these stocks and the latter, at the same time, freed of the tendency to scorch.

The examples listed in the following table are typical of the class. The increase in hardness was measured by the Shore durometer, while the bending strength was measured by an Olsen machine, a well-known tensile and compression testing machine. The bending strength determinations were made by taking a small square of cured tile stock of about 4x4x¼ inches, placing it on edge between the heads of the Olsen machine, and bending it, the beam being kept in place.

It was found that after the square had started to bend, its bending strength was fairly constant until it was deflected so that the edges were approximately one inch apart. It was also observed that a high load is required to start bending which decreases sharply to a value somewhat above that of the value applicable during the major part of the bending operation. Three parts of acid were added to the control compound.

| Material | Bending strength | Shore durometer hardness |
|---|---|---|
| Control | 16-9 lbs | 88 |
| Furoic acid | 28-21 lbs | 95 |

The following example gives the scorching results obtained with the ultra-accelerator zinc dimethyl dithiocarbamate. As with mercaptobenzothiazole, zinc dimethyl dithiocarbamate may be used with nearly any of the standard rubber formulae, the following being selected for purposes of simplicity:

| | Parts by weight |
|---|---|
| Rubber (pale crepe) | 50.00 |
| Rubber (smoked sheet) | 50.00 |
| Zinc oxide | 10.00 |
| Pigment | 10.00 |
| Sulfur | 3.00 |
| Zinc dimethyl dithiocarbamate | .40 |
| | 123.40 |

To portions of this compound was added one part of furoic acid. Physical properties and scorch tests were obtained as above outlined for mercaptobenzothiazole. Results were as follows:

| Material | Maximum tensile | Maximum elongation | Index number—Mins. to scorch at 99° C. |
|---|---|---|---|
| Control | 224 | 770 | 20 |
| Furoic acid | 220 | 730 | 72 |

It is evident that the control stock is a fast low temperature curing compound and has a decided tendency to scorch. The addition of furoic acid results in a marked decrease in the scorching tendency of the stock, changing it from a stock impracticable to handle in the factory to one of the same physical properties which can be handled with little or no trouble.

Other examples demonstrating the scorch retarding properties of furoic acid are found in the following tests conducted with a compound containing butyraldehydeaniline (DuPont 808) as the accelerator. Inasmuch as the latter is a high temperature accelerator, these trials were made with the adaptation of the scorch test formula to obtain optimum cures at 310 degrees F. The compound used is as follows:

| | Parts by weight |
|---|---|
| Rubber (pale crepe) | 50.00 |
| Rubber (smoked sheet) | 50.00 |
| Zinc oxide | 10.00 |
| Sulfur | 2.50 |
| Accelerator | 1.25 |
| | 123.75 |

To this basic formula, varying amounts of furoic acid were added and after uniform mixing the stocks were cured at 310 degrees F. and subjected to physical tests. Index numbers also were obtained on the unvulcanized stock by the method outlined above. Results were as follows:

| Material | Amounts added | Ultimate tensile | Maximum elongation | Index number at 99.5° C |
|---|---|---|---|---|
| Control | | 239 | 700 | 56 |
| Furoic acid | .50 | 173 | 675 | 124 |

From the foregoing examples, which illustrate the improved process of my invention, it will be seen that the addition of a small portion of furoic acid to the rubber mix effectively prevents scorching at temperatures ordinarily met with in the milling of the rubber prior to vulcanization and that the acid added to the stock does not interfere with the vulcanization of the rubber at higher temperatures. The unvulcanized stock is stable and can be kept without the necessity of cooling it to a low temperature and without the danger of self-vulcanization during storage.

Another advantage of my invention is apparent in rubber cements which are commonly used in various manufacturing processes, in particular those cements which are self-curing or air-curing. One of the main difficulties has been the gelling, or setting up, of the self-curing cement a short time after the preparation of the mixture, making it necessary to use these cements within a very short time. By the use of the furoic acid this gelling is greatly retarded.

Another advantageous use of my invention lies in the decreased amounts of softener required in rubber stocks. Heretofore, it has been necessary in processing to use various percentages of certain rubber softeners, such as pine tar and pine oil, which supposedly by their softening action render the stocks less "scorchy". These softeners, however, detract from the quality of the rubber compound, especially in abrasive resistance, and the more the softener, the less the quality as a general rule. By the use of furoic acid, smaller amounts of softeners may be used, the stocks being capable of processing at somewhat higher temperatures without the usual dangers of scorching.

Still another advantage, as above pointed out, lies in its use in highly compounded, heavily-loaded stocks, wherein it increases materially the hardness and resistance to bending, which discovery is claimed in my copending application Serial No. 696,688, filed Nov. 4, 1933.

From the foregoing it will be seen that my invention is of general application in the vulcanization of rubber compounds, whether or not containing the usual compounding ingredients such as reinforcing pigments, activators, softeners, antioxidants, etc., all or any of which may be employed advantageously. It is of course desirable, although not strictly necessary, to determine by test the preferred amount in each case. It will be understood that numerous changes may be made in the invention without departing from the spirit thereof.

It is intended that the patent shall cover, by suitable expression in the appended claims, whatever features of patentable novelty reside in the invention herein disclosed.

What I claim is:

1. The improvement in the prevention or retarding of scorching of rubber compounds which comprises incorporating in the rubber compound a vulcanizing agent, an active accelerator and a small amount of furoic acid.

2. A vulcanizable rubber compound containing an active accelerator, said compound being stabilized against scorching by the addition of a small amount of furoic acid.

3. A process of treating a vulcanizable rubber mix containing a vulcanizing agent, a metallic oxide and a thiazyl sulphide accelerator, for retarding or inhibiting the prevulcanization thereof, and permitting vulcanization at elevated temperatures, consisting in incorporating in the compound furoic acid.

4. A vulcanizable rubber composition retarded as to vulcanization at prevulcanization temperatures and vulcanizable at elevated temperatures, including a semi-ultra or ultra accelerator, and furoic acid.

5. A rubber composition retarded as to vulcanization at prevulcanization temperatures and vulcanizable at elevated temperatures including a vulcanizing agent, zinc oxide, a thiazyl sulphide accelerator, and furoic acid.

HERMAN R. THIES.